United States Patent
Wang et al.

(10) Patent No.: US 10,254,741 B2
(45) Date of Patent: Apr. 9, 2019

(54) ROBOT APPARATUS HAVING LEARNING FUNCTION

(71) Applicant: FANUC CORPORATION, Yamanashi (JP)

(72) Inventors: Kaimeng Wang, Yamanashi (JP); Wenjie Chen, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 136 days.

(21) Appl. No.: 15/405,190

(22) Filed: Jan. 12, 2017

(65) Prior Publication Data

US 2017/0205802 A1 Jul. 20, 2017

(30) Foreign Application Priority Data

Jan. 14, 2016 (JP) .................................. 2016-005377
Nov. 18, 2016 (JP) .................................. 2016-225207

(51) Int. Cl.
*G05B 19/00* (2006.01)
*G05B 19/404* (2006.01)
*B25J 9/16* (2006.01)

(52) U.S. Cl.
CPC ............ *G05B 19/404* (2013.01); *B25J 9/163* (2013.01); *G05B 2219/39352* (2013.01)

(58) Field of Classification Search
USPC ................................................. 700/245–264
See application file for complete search history.

(56) References Cited

U.S. PATENT DOCUMENTS

| | | | | |
|---|---|---|---|---|
| 4,638,445 A | * | 1/1987 | Mattaboni | B25J 9/0003 180/168 |
| 4,642,752 A | * | 2/1987 | Debarbieri | B23K 9/1274 219/124.34 |
| 5,121,497 A | * | 6/1992 | Kerr | G06F 13/107 719/328 |

(Continued)

FOREIGN PATENT DOCUMENTS

| | | |
|---|---|---|
| JP | 5-173618 A | 7/1993 |
| JP | 2011-192267 A | 9/2011 |

(Continued)

*Primary Examiner* — Jonathan L Sample
(74) *Attorney, Agent, or Firm* — Hauptman Ham, LLP

(57) ABSTRACT

A robot apparatus includes a robot mechanism; a sensor provided in a portion whose position is to be controlled, of the robot mechanism, for detecting a physical quantity to obtain positional information of the portion; and a robot controller having an operation control unit for controlling the operation of the robot mechanism. The robot controller includes a learning control unit for calculating a learning correction value to improve a specific operation of the robot mechanism based on the physical quantity detected, while the operation control unit makes the robot mechanism perform the specific operation, with the sensor; and a learning extension unit for obtaining the relationship between the learning correction value calculated by the learning control unit and information about the learned specific operation, and calculates another learning correction value to improve a new operation by applying the obtained relationship to information about the new operation without sensor.

4 Claims, 4 Drawing Sheets

(56) References Cited

U.S. PATENT DOCUMENTS

| | | | | |
|---|---|---|---|---|
| 5,719,480 A | * | 2/1998 | Bock | B25J 9/163 318/561 |
| 5,994,864 A | * | 11/1999 | Inoue | B25J 9/1633 318/568.2 |
| 6,169,981 B1 | * | 1/2001 | Werbos | G05B 13/0265 706/15 |
| 6,961,060 B1 | * | 11/2005 | Mochizuki | A63F 13/12 345/473 |
| 8,419,804 B2 | * | 4/2013 | Herr | A61F 2/60 623/24 |
| 8,924,021 B2 | * | 12/2014 | Dariush | G06N 3/008 700/245 |
| 8,958,912 B2 | * | 2/2015 | Blumberg | B25J 9/0087 700/259 |
| 9,056,396 B1 | * | 6/2015 | Linnell | G05B 19/427 |
| 9,144,907 B2 | * | 9/2015 | Summer | B25J 9/1689 |
| 9,314,924 B1 | * | 4/2016 | Laurent | B25J 9/163 |
| 9,874,865 B2 | * | 1/2018 | Wada | B25J 9/1641 |
| 2003/0108415 A1 | * | 6/2003 | Hosek | B25J 9/1664 414/783 |
| 2003/0220714 A1 | * | 11/2003 | Nakamura | B25J 9/1633 700/245 |
| 2004/0030449 A1 | * | 2/2004 | Solomon | B64C 39/024 700/245 |
| 2004/0167641 A1 | * | 8/2004 | Kawai | A61B 5/1038 700/63 |
| 2004/0172168 A1 | * | 9/2004 | Watanabe | B25J 9/1664 700/264 |
| 2004/0267404 A1 | * | 12/2004 | Danko | B25J 9/1607 700/245 |
| 2005/0054381 A1 | * | 3/2005 | Lee | G06F 3/011 455/557 |
| 2006/0207419 A1 | * | 9/2006 | Okazaki | B25J 9/142 91/35 |
| 2006/0217841 A1 | * | 9/2006 | Matsumoto | B25J 9/1669 700/248 |
| 2006/0250101 A1 | * | 11/2006 | Khatib | B25J 9/1633 318/568.2 |
| 2007/0074177 A1 | * | 3/2007 | Kurita | G06F 8/75 717/131 |
| 2007/0151389 A1 | * | 7/2007 | Prisco | B25J 9/1633 74/490.05 |
| 2007/0200525 A1 | * | 8/2007 | Kanaoka | G05D 1/0208 318/568.21 |
| 2007/0255454 A1 | * | 11/2007 | Dariush | G06N 3/008 700/245 |
| 2008/0114710 A1 | * | 5/2008 | Pucher | G06N 99/005 706/20 |
| 2008/0140257 A1 | * | 6/2008 | Sato | B25J 9/1633 700/258 |
| 2008/0319929 A1 | * | 12/2008 | Kaplan | G06N 3/004 706/14 |
| 2009/0272585 A1 | * | 11/2009 | Nagasaka | B25J 9/1633 180/8.6 |
| 2010/0152896 A1 | * | 6/2010 | Komatsu | B25J 9/0003 700/258 |
| 2010/0152899 A1 | * | 6/2010 | Chang | B25J 9/162 700/262 |
| 2010/0305758 A1 | * | 12/2010 | Nishi | B23Q 17/00 700/264 |
| 2011/0060460 A1 | * | 3/2011 | Oga | B25J 9/1633 700/254 |
| 2011/0067479 A1 | * | 3/2011 | Davis | B25J 9/1692 73/1.75 |
| 2011/0160906 A1 | * | 6/2011 | Orita | B62D 57/032 700/260 |
| 2011/0160907 A1 | * | 6/2011 | Orita | B25J 9/1607 700/260 |
| 2011/0208356 A1 | * | 8/2011 | Kato | B25J 9/163 700/253 |
| 2011/0218676 A1 | * | 9/2011 | Okazaki | B25J 9/1075 700/260 |
| 2012/0144242 A1 | * | 6/2012 | Vichare | G06F 11/0751 714/39 |
| 2012/0150777 A1 | * | 6/2012 | Setoguchi | G06F 17/30528 706/14 |
| 2012/0197439 A1 | * | 8/2012 | Wang | B25J 9/1689 700/259 |
| 2012/0296471 A1 | * | 11/2012 | Inaba | B25J 9/1633 700/253 |
| 2013/0000480 A1 | * | 1/2013 | Komatsu | B25J 9/1615 92/48 |
| 2013/0173060 A1 | * | 7/2013 | Yoo | B25J 9/1633 700/261 |
| 2013/0245829 A1 | * | 9/2013 | Ohta | B25J 9/1633 700/261 |
| 2014/0012419 A1 | | 1/2014 | Nakajima et al. | |
| 2014/0014638 A1 | * | 1/2014 | Artelsmair | B23K 9/126 219/130.01 |
| 2014/0114479 A1 | * | 4/2014 | Okazaki | B25J 13/085 700/253 |
| 2014/0222186 A1 | * | 8/2014 | Wada | B25J 9/1641 700/114 |
| 2014/0371907 A1 | * | 12/2014 | Passot | G06N 3/008 700/257 |
| 2015/0105905 A1 | * | 4/2015 | Nishida | B25J 9/1641 700/254 |
| 2015/0127149 A1 | * | 5/2015 | Sinyavskiy | B25J 9/163 700/250 |
| 2015/0217449 A1 | * | 8/2015 | Meier | B25J 9/1602 700/257 |
| 2015/0251312 A1 | | 9/2015 | Suzuki et al. | |
| 2016/0096272 A1 | * | 4/2016 | Smith | B25J 9/163 700/253 |
| 2016/0346923 A1 | * | 12/2016 | Kesil | B25J 9/163 |

FOREIGN PATENT DOCUMENTS

| | | |
|---|---|---|
| JP | 2012-240142 A | 12/2012 |
| JP | 2013-169644 A | 9/2013 |
| JP | 2015-168053 A | 9/2015 |

* cited by examiner

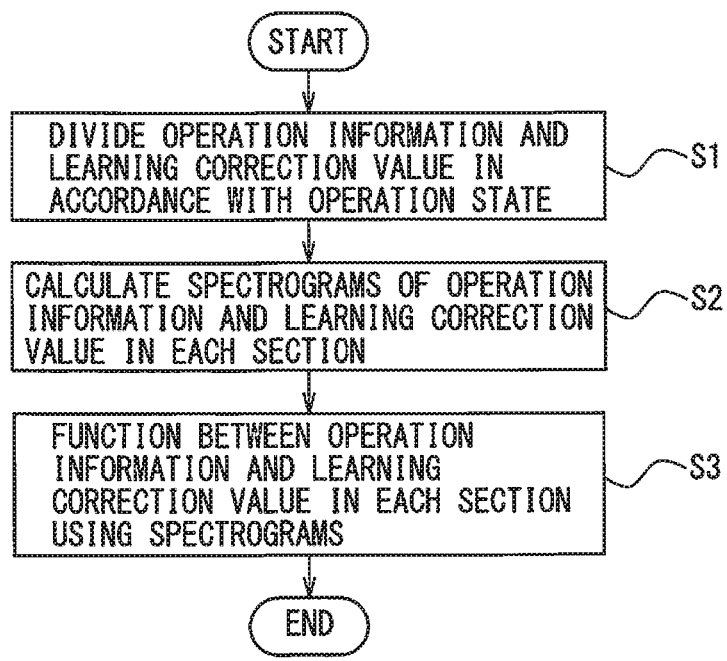

ROBOT APPARATUS HAVING LEARNING FUNCTION

This application is a new U.S. patent application that claims benefit of JP 2016-005377 filed on Jan. 14, 2016, and JP 2016-225207 filed on Nov. 18, 2016, the contents of 2016-005377 and 2016-225207 are incorporated herein by reference.

BACKGROUND OF THE INVENTION

1. Field of the Invention

The present invention relates to a robot apparatus, and specifically relates to an articulated robot apparatus having a learning function, that is, the function of calculating a learning correction value to improve the operation of a robot.

2. Description of Related Art

Robots having a learning function, that is, the function of generating a learning correction value to improve the operation of the robot by repetition of the specific operation of the robot are known. Also, when teaching and correcting the operation based on the generated learning correction value, while the robot is being operated, there is a proposed method in which the speed of the robot is reduced to a safe level and the learning correction value is made zero, in order to prevent a situation in which an incorrect learning correction value is applied to the corrected operation (for example, Japanese Unexamined Patent Publication (Kokai) No. 2011-192267, hereinafter called "patent document 1").

Patent document 1 proposes measures against an exception process in the learning or actual operation of a robot having a learning control function, and a method for relearning. The patent document 1 also proposes a method in which, when teaching and correcting the operation, if a correction amount is within a certain range, a learning correction value of an adjacent position is applied as is. If the correction amount is outside of the certain range, the learning correction value is made zero by deceleration.

However, according to this conventional art, when a learning correction value depends on the position of a to-be-controlled portion of a robot, applying a learning correction value of a different position as-is may interfere with the effect of suppressing vibration. In the case of a large correction amount, a learning correction value is made zero by deceleration, thus interfering with the speed advantage. Also, in systems that perform a tracking operation using a vision sensor or the like, the conventional art cannot be applied to the systems in a situation where the position of a work changes at random.

SUMMARY OF THE INVENTION

The present invention aims at providing a robot apparatus that obtains the relationship between a learning correction value and operation information, and calculates a learning correction value for a new operation that has not been learned using the relationship, thus eliminating the need for a relearning operation to be performed with a sensor.

A robot apparatus according to an embodiment of the present invention includes a robot mechanism; a sensor provided in a portion the position of which is to be controlled, of the robot mechanism, for detecting a physical quantity to directly or indirectly obtain positional information of the portion; and a robot controller having an operation control unit for controlling the operation of the robot mechanism. The robot controller includes a learning control unit for calculating a learning correction value to improve a specific operation of the robot mechanism based on the physical quantity detected, while the operation control unit makes the robot mechanism perform the specific operation, with the sensor; and a learning extension unit for obtaining the relationship between the learning correction value calculated by the learning control unit and information about the learned specific operation, and calculates another learning correction value to improve a new operation that is different from the specific operation of the robot mechanism, by applying the obtained relationship to information about the new operation without sensor.

BRIEF DESCRIPTION OF THE DRAWINGS

The objects, features, and advantages of the present invention will be more apparent from the following description of an embodiment in conjunction with the attached drawings, wherein:

FIG. 3 is a flowchart of a process of calculating a transfer function in the robot apparatus according to the embodiment of the present invention;

DETAILED DESCRIPTION OF THE INVENTION

Figure 1:
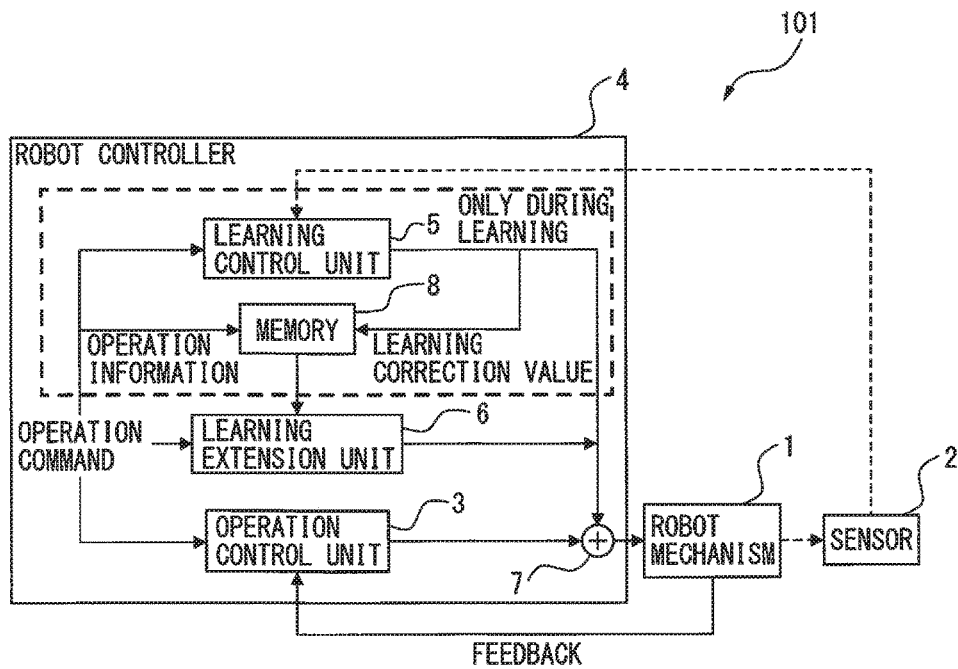
FIG. 1 is a block diagram of a robot apparatus according to an embodiment of the present invention.

A robot apparatus according to an embodiment of the present invention will be described below with reference to the drawings. FIG. 1 is a block diagram of the robot apparatus according to the embodiment of the present invention. A robot apparatus 101 according to the embodiment of the present invention includes a robot mechanism 1, a sensor 2, and a robot controller 4.

The sensor 2 is provided in a portion, the position of which is to be controlled, of the robot mechanism 1. The sensor 2 detects a physical quantity to directly or indirectly obtain positional information of the portion. For example, an acceleration sensor is usable as the sensor 2. The portion, the position of which is to be controlled, of the robot mechanism 1 is, for example, a spot welding gun provided in a spot welding robot. However, the portion of the robot apparatus is not limited thereto, but may be another portion.

The robot controller 4 has an operation control unit 3 for controlling the operation of the robot mechanism 1. The operation control unit 3 drives the robot mechanism 1 in response to an operation command received from a host control device (not-shown) or the like, and also controls the operation of the robot mechanism 1 based on feedback data from the robot mechanism 1. As a feedback control, at least one of a position feedback control, a velocity feedback control, and a current feedback control is available. By the feedback control, the position or velocity of the robot mechanism 1 is controlled so as to coincide with a command position or a command velocity.

Figure 2:
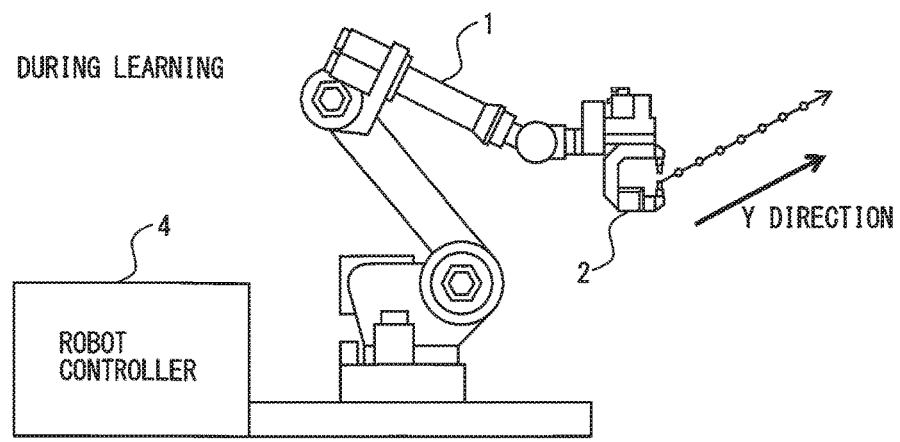
FIG. 2 is a drawing showing a path of a portion the position of which is to be controlled, of the robot apparatus during learning according to the embodiment of the present invention.

The robot controller 4 further includes a learning control unit 5 and a learning extension unit 6. The learning control unit 5 calculates a learning correction value to improve a specific operation of the robot mechanism 1 based on a physical quantity detected, while the operation control unit 3 makes the robot mechanism 1 perform the specific operation, with the sensor 2. The specific operation performed by the robot mechanism 1 includes, for example, spot welding operations in an arrow direction (Y direction) as shown in FIG. 2. The specific operation may be an operation used in an operation program, or an operation in or about an X axis, a Y axis, or a Z axis automatically generated within a specified operation range. By performing the specific operation, the learning control unit 5 calculates a learning correction value to reduce vibration in the robot. The calculated learning correction value and operation information obtained from the operation command are stored in a memory 8. The operation information on the robot mechanism 1 preferably includes at least one of the position, the operation velocity, the acceleration, and the inertia of the robot mechanism 1.

When an acceleration sensor is used as the sensor 2, the sensor 2 detects the acceleration of the portion, the position of which is to be controlled, of the robot mechanism 1, as the physical quantity. The learning correction value calculated by the learning control unit 5 is added to a command value from the operation control unit 3 in an adder 7, and the corrected command value is inputted to the robot mechanism 1.

The present invention proposes a method and apparatus for calculating another learning correction value for an unlearned operation without sensor, based on the operation information on the learned operation and the generated learning correction value. To be more specific, while the robot performs the specific operation, the correction value is learned to improve the operation of the robot. Next, a transfer function between the operation information and the learning correction value is obtained based on spectrograms of the information about the specific operation and the learning correction value. Using this transfer function, another learning correction value is calculated based on information about an unlearned operation without sensor.

The learning extension unit 6 calculates the relationship between the learning correction value calculated by the learning control unit 5 and the information about the learned specific operation. The learning extension unit 6 calculates another learning correction value by applying the obtained relationship to information about a new operation that is different from the specific operation of the robot mechanism 1, to improve the new operation without sensor.

To be more specific, after the robot mechanism 1 performs the specific operation and the learning correction value is obtained, the robot mechanism 1 is operated based on a new operation command. During the shutdown period or during the operation, the learning extension unit 6 calculates the transfer function that represents the relationship between the operation information and the learning correction value stored in the memory 8. The new operation information obtained from the operation command is inputted to the learning extension unit 6. The learning extension unit 6 calculates the learning correction value for the new operation based on the above transfer function. The learning correction value is added to the command value outputted from the operation control unit 3.

As described above, the learning extension unit 6 obtains the transfer function between the learning correction value and the operation information from the spectrograms of the learning correction value calculated by the learning control unit 5 and the specific operation information of the robot mechanism 1, and calculates the other learning correction value for the new operation based on the transfer function by input of the information about the new operation.

In the robot controller 4, the operation control unit 3 may make the robot mechanism 1 operate at a maximum speed or a maximum acceleration allowable by the robot mechanism 1 or in a simulation mode, to obtain the operation information on the robot mechanism 1.

Note that, the learning control unit 5 and the learning extension unit 6 are not operated at the same time. The learning control unit 5 works only during learning, but does not work during reproduction (operation) after the completion of the learning. On the contrary, the learning extension unit 6 works only during the reproduction (operation), but does not work during the learning.

Next, a method for calculating the transfer function will be described.

Figure 4A:
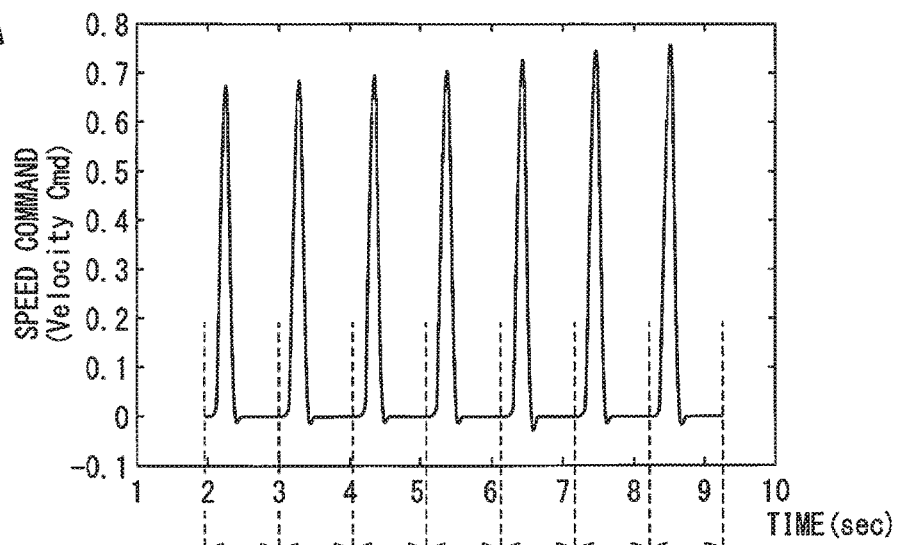
FIG. 4A is a graph showing a variation with time in the velocity of the robot apparatus according to the embodiment of the present invention.
Figure 4B:
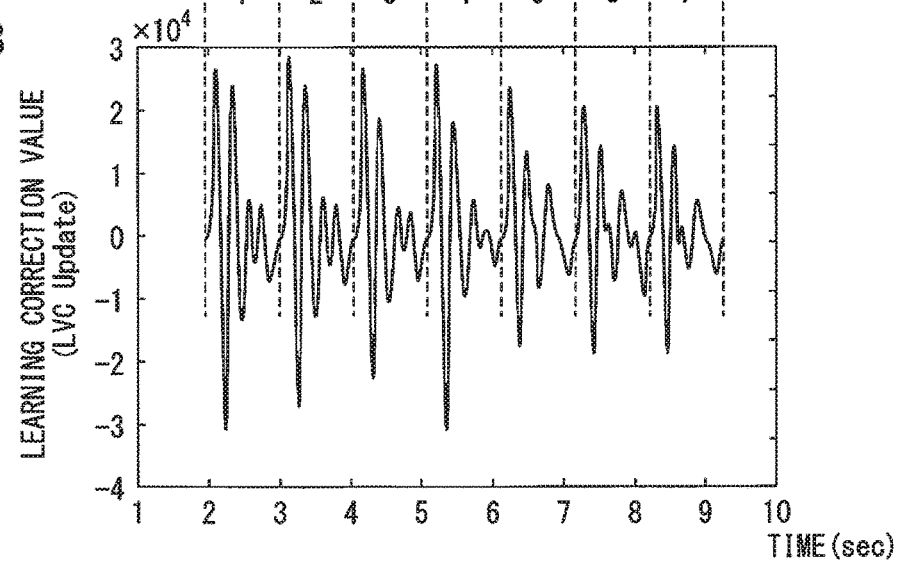
FIG. 4B is a graph showing a variation with time in a learning correction value of the robot apparatus according to the embodiment of the present invention.

FIG. 3 is a flowchart of a process of calculating the transfer function. FIGS. 4A and 4B show variations with time in a velocity command and a learning correction value, respectively, in the robot apparatus according to the embodiment of the present invention. First, in step S1, operation information (for example, velocity data) and a learning correction value obtained during learning are stored in the memory, and divided into one or a plurality of sections in accordance with an operation state. More specifically, as shown in FIGS. 4A and 4B, a time when the robot starts operating from a stationary state is determined as a start point of each of sections 1 to 7. A time when the operation is stopped and the next operation is started is determined as an end point of each of the sections 1 to 7. The transfer function may be obtained from the data of time without dividing the sections.

Next, in step S2, spectrograms of the operation information (for example, velocity data) and the learning correction value are calculated as follows in each section by a short-time Fourier transform.

$$Y_i(m, f) = \sum_{k=0}^{n-1} \omega(k) y_i(j_m - k) e^{-j\frac{2\pi}{n} fk} \quad (1)$$

Here, $y_i$ represents a velocity, $Y_i$ represents the obtained spectrogram of the velocity, $\omega$ represents a window function, k represents an index, m represents a section number, $j_m$ represents an index at the end time of the section m, f represents an index of a section of a frequency, n represents a number of data of a predetermined operation, and a numerical subscript i represents an axial number that indicates the i-th axis of a plurality of axes. For example, in a six-axis articulated robot, i is 1 to 6.

When SIFT represents the short-time Fourier transform, the above equation (1) is represented as follows.

$$Y_i = \text{STFT}\{y_i\} \quad (2)$$

When $Y_i$ is already known, a process of obtaining $y_i$ is represented as follows using an inverse transform ISTFT.

$$y_i = \text{ISTFT}\{Y_i\} \quad (3)$$

The spectrogram of the learning correction value and an inverse transform thereof are calculated in a like manner.

$$X_i = \text{STFT}\{x_i\} \quad (4)$$

$$x_i = \text{ISTFT}\{X_i\} \quad (5)$$

Here, $x_i$ represents the learning correction value, $X_i$ represents the obtained spectrogram of the learning correction value, and a numerical subscript i represents an axial number.

Next, in step S3, the transfer function between the velocity and the learning correction value is obtained in each section as follows.

$$C_i(m,f) = \frac{X_i(m,f)}{Y_i(m,f)} = \frac{\sum_{k=0}^{n-1} \omega(k) x_i (j_m - k) e^{-j\frac{2\pi}{n} fk}}{\sum_{k=0}^{n-1} \omega(k) y_i (j_m - k) e^{-j\frac{2\pi}{n} fk}} \quad (6)$$

Here, $C_i$ represents the transfer function between the velocity and the learning correction value, m represents a number of a section, and the numerical subscript i represents an axial number.

Figure 5:
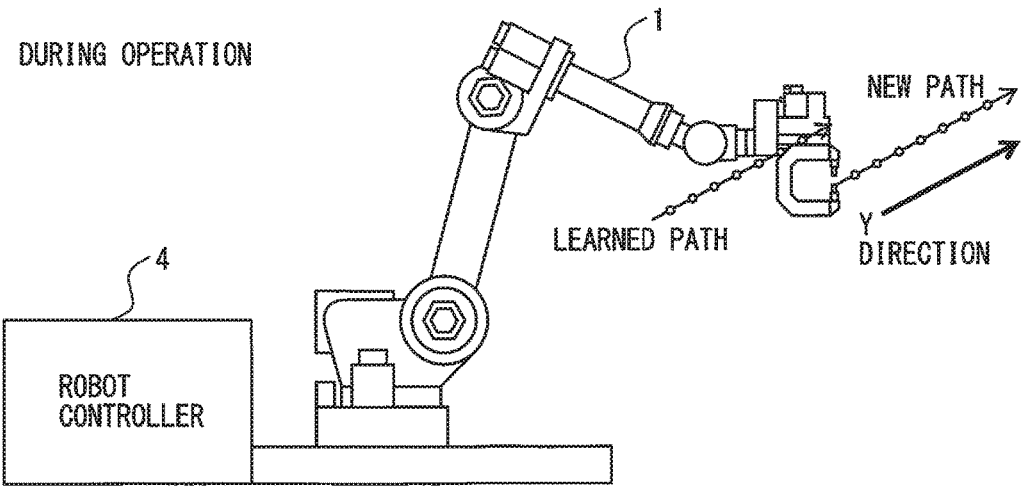
FIG. 5 is a drawing showing a new path of the portion, the position of which is to be controlled, of the robot apparatus during operation according to the embodiment of the present invention.

FIG. 5 shows a new path of the portion, the position of which is to be controlled, of the robot apparatus during operation according to the embodiment of the present invention. During operation, as shown in FIG. 5, the robot having the robot mechanism 1 performs spot welding operations in a Y direction in new positions different from learned positions. While the robot is operating, the distance between the position of each interpolation obtained from an operation command and the learned position is calculated. A section having the shortest distance is selected, and a transfer function of the section is used. The section of the transfer function to be used is selected based on the distance. However, a section having the closest inertia may be selected based on the inertia. Based on the selected transfer function, a learning correction value is calculated for a new operation command by substituting velocity information into the transfer function. The calculated learning correction value is added to the operation command, and a result is outputted to the robot having the robot mechanism 1.

Figure 6:
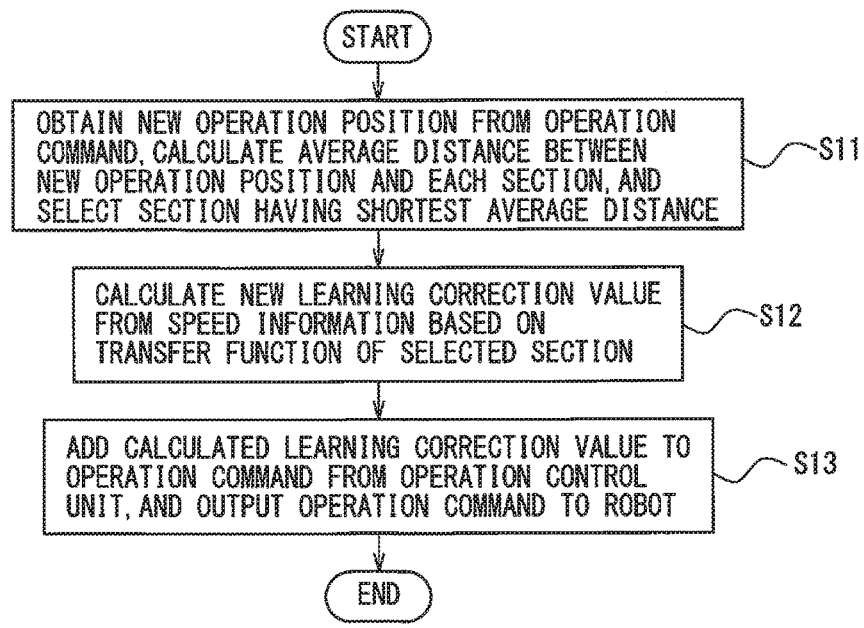
FIG. 6 is a flowchart of a process of calculating a learning correction value for the new position of the robot apparatus according to the embodiment of the present invention.

$P_t$ represents the position of the portion to be controlled at a certain time obtained from an operation command. FIG. 6 is a flowchart of a process of calculating a learning correction value for the new position $P_t$.

First, in step S11, the new operation position is obtained from the operation command. The average distance between the new operation position and each section is calculated, and the section having the shortest average distance is selected. The distance between each interpolated point of a learned position and $P_t$ ($x_{pt}$, $y_{pt}$, $z_{pt}$) is calculated as follows.

$$s_k = |P_t - P_k| = \sqrt{(x_{P_t} - x_{P_k})^2 + (y_{P_t} - y_{P_k})^2 + (z_{P_t} - z_{P_k})^2} \quad (7)$$

wherein, $P_k$ represents a position ($x_{pk}$, $y_{pk}$, $z_{pk}$) at a time k.

The average distance $S_m$ between $P_t$ and $P_k$ is calculated over each section, and the section having the shortest distance to $P_t$ is selected. However, a section having the closest inertia may be selected.

$$S_m = \frac{1}{n} \sum_{k=0}^{n-1} S_k \quad (8)$$

wherein, m represents a section number and n represents number of data in a section m, respectively.

Next, in step S12, a new learning correction value for $P_t$ is calculated from velocity information based on a transfer function of the selected section.

$$\dot{P}_{joint} = \text{STFT}\{\dot{p}_{joint}\} \quad (9)$$

$$Q_i = C_i(m,f) \dot{P}_{joint} \quad (10)$$

$$q_i = \text{ISTFT}\{Q_i\} \quad (11)$$

wherein, $P_{joint}$ represents a position of each axis on a section of each axis of $P_t$, $\dot{p}_{joint}$ represents a velocity, i.e. the differentiation of $P_{joint}$, $\dot{P}_{joint}$ represents spectrogram of $\dot{p}_{joint}$, $q_i$ represents a learning correction value for the position $P_t$, $Q_i$ represents spectrogram of $q_i$, and a numerical subscript i represents an axial number.

Next, in step S13, the learning correction value $x_i$ calculated in step S12 is added to the operation command from the operation control unit 3, and a result is outputted to the robot having the robot mechanism 1.

The velocity data is used as the operation information in the above description, but is not limited thereto, and position, acceleration, inertia, or the like may be used as the operation information instead.

As described above, the present invention allows calculating the transfer function between the operation information and the learning correction value on the robot that performs the specific operation. Thus, the use of the transfer function allows calculating the other learning correction value for the unlearned operation, without using a sensor. This eliminates the need for setting up the sensor and the burden of relearning, thus reducing setup time for learning. Also, the present invention is applicable to systems that detect a work in an unfixed position using a vision sensor or the like.

According to the robot apparatus of the present invention, obtaining the relationship between the learning correction value and the operation information allows calculating the other learning correction value for the unlearned new operation, thus eliminating the need for a relearning operation, which is performed with a sensor. The present invention is also applicable to systems that perform a tracking operation using a vision sensor or the like, though conventional techniques cannot be applied to the systems.

What is claimed is:

1. A robot apparatus comprising:
   a robot mechanism;
   a sensor provided in a portion, the position of which is to be controlled, of the robot mechanism, for detecting a physical quantity to directly or indirectly obtain positional information of the portion; and
   a robot controller having an operation control unit for controlling the operation of the robot mechanism, wherein
   the robot controller includes:
      a learning control unit for calculating a learning correction value to improve a specific operation of the robot mechanism based on the physical quantity detected, while the operation control unit makes the robot mechanism perform the specific operation, with the sensor; and a learning extension unit for obtaining the relationship between the learning correction value calculated by the learning control unit and information about the learned specific operation, and calculates another learning correction value to improve a new operation that is different from the specific operation of the robot mechanism, by applying the obtained relationship to information about the new operation without sensor, and wherein the learning extension unit obtains a transfer function between the learning correction value and the operation information from spectrograms of the learning correction value calculated by the learning control unit and the information about the specific operation of the robot mechanism, and calculates the learning correction value for the new operation based on the transfer function by input of the information about the new operation.

2. The robot apparatus according to claim 1, wherein the operation information of the robot mechanism includes at least one of position, operation velocity, acceleration, and inertia.

3. The robot apparatus according to claim 1, wherein
the robot controller makes the operation control unit operate the robot mechanism at a maximum speed or a maximum acceleration allowed by the robot mechanism or in a simulation mode to obtain the operation information on the robot mechanism, and
the learning extension unit calculates the learning correction value for the new operation based on the operation information.

4. The robot apparatus according to claim 1, wherein the specific operation is an operation used in an operation program, or an operation in or about an X axis, a Y axis, or a Z axis automatically generated in a specified operation range.

* * * * *